June 27, 1961 C. MANKOUSKI 2,990,468
HOLDER FOR WELDING RODS
Filed Aug. 16, 1957 2 Sheets-Sheet 1
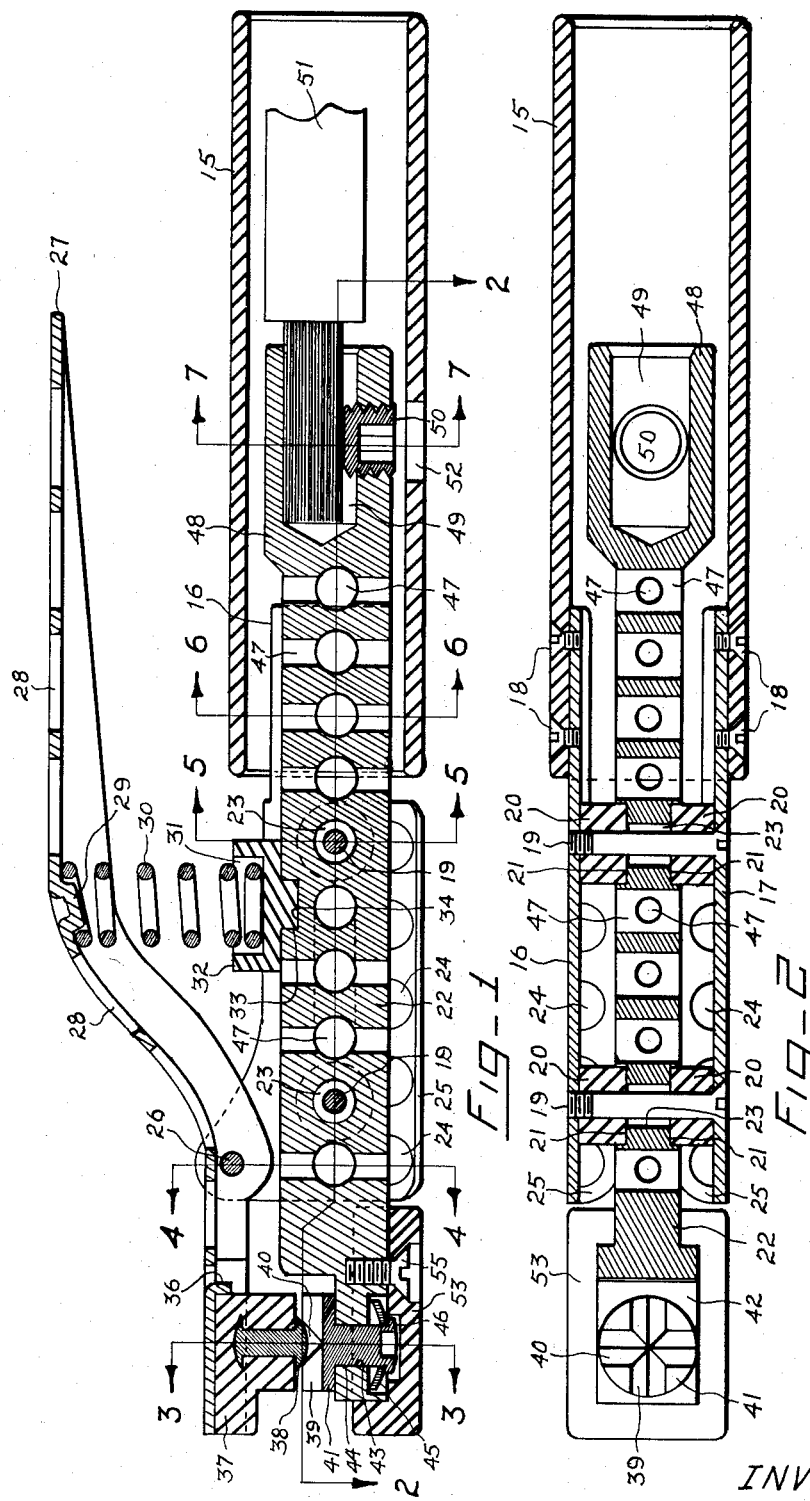
INVENTOR.
Charles Mankouski June 27, 1961
C. MANKOUSKI
2,990,468
HOLDER FOR WELDING RODS
Filed Aug. 16, 1957
2 Sheets-Sheet 2
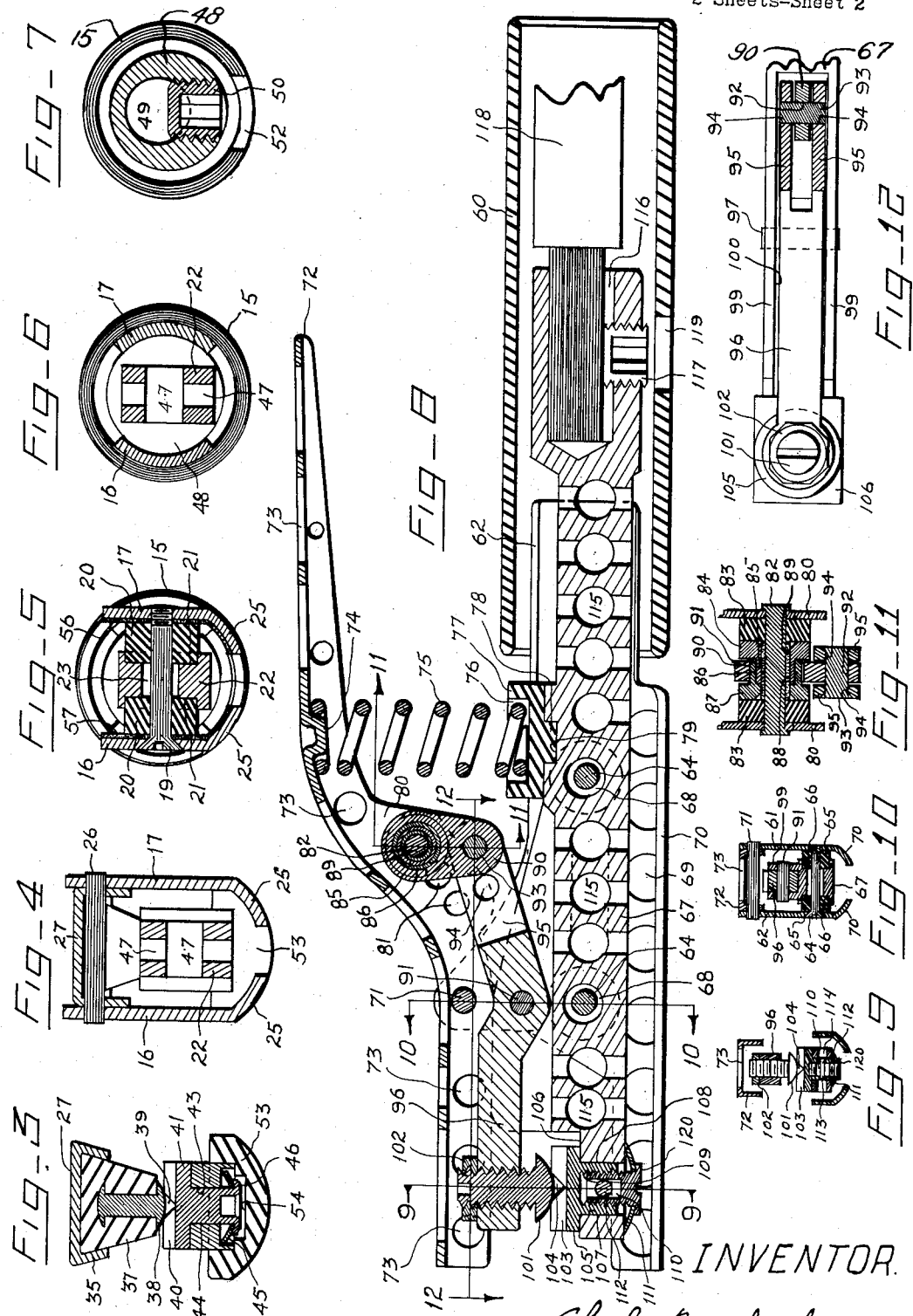
INVENTOR.
Charles Mankouski United States Patent Office 2,990,468
Patented June 27, 1961

2,990,468
HOLDER FOR WELDING RODS
Charles Mankouski, Middleville, N.Y.
Filed Aug. 16, 1957, Ser. No. 678,676
2 Claims. (Cl. 219—138)

This invention relates generally to electric arc welding and particularly to an improvement in welding rod holders.

The main object of this invention is to provide an ideal atmospheric air cooled welding rod holder by using a pair of non-current carrying formed metallic plates arranged in parallel to form an external housing, having one end mounted to the inside of a tubular gripping handle. The metallic housing is adapted to contain in an insulated manner, a current conducting metallic body by using four small cylindrically shaped insulation bushings arranged transversely and partly recessed into the sides of the current conducting metallic body. The metallic body is provided with a rotatable jaw means on one end and a welding cable clamping connection means on the other end, to accommodate a welding cable in a manner whereby the current conducting body does not come in contact with the insides of the tubular gripping handle, but is suspended freely in space within the tubular gripping handle, allowing atmospheric air to circulate about the welding cable and welding cable connection. This arrangement assures an absolutely cool holder as has never been attained before.

One of the chief causes of welding rod holder gripping handles to heat up, is due to the fact that particularly all of the welding rod holders have their tubular gripping handles attached directly to a portion of the current conducting body, which is also a heat conducting body, that causes the heat to travel to the tubular gripping handle to make it unbearably hot during production welding.

The second object is to provide a welding rod holder constructed with a rotatably mounted jaw provided with welding rod receiving crossed V grooves. The rotatably mounted jaw is secured with an adjustable tension controlled means to a current conducting mounting member, by using a cupped spring with an adjusting means to obtain proper tension, which is great enough to prevent the development of welding current resistance heat, that would develop at the joint if tension means were not used. The rotatable jaw feature provides the user with a means whereby the welding angle may be changed or adjusted while the welding arc is in operation, from 0° to substantially 140° either side of the welding rod holder.

The third object is to construct a welding rod holder not requiring the removal of any parts, in order to attach or detach the welding cable and that such welding cable connection is not secured in a manner to make any contact with the inside of the gripping handle. This arrangement assures maximum coolness of the tubular handle.

The fourth object is to construct a welding rod holder that uses its non-current carrying metallic housing plates to form a guard about its welding rod receiving portion, allowing air to circulate completely about the extremely hot portions of the holder. The general practice with other electrode holders is to insulate the area with insulation, a method that retards cooling.

The fifth object is to construct a welding rod holder provided with a metallic non-current carrying welding rod clamping handle hingedly mounted to a pair of non-current carrying metallic housing plates arranged in parallel to contain in an insulated manner a central current conducting jaw carrying member, having a recess in its body to provide space for a pivotally mounted second jaw carrying member in a manner whereby the second jaw carrying member has the opposite end of its jaw carrying portion form an extended clevis opening to accommodate a pivot arranged link, in a manner whereby the opposite end of the link is connected to another pivot connection that is mounted in the welding rod clamping handle in an insulated manner, whereby the non-current carrying welding rod clamping handle is movable in relation with the second jaw carrying member in a manner to form a guard about the welding rod receiving portion of the holder for welding rod.

The sixth object is to provide a welding rod holder that is practical in operation, inexpensive to manufacture, using metal stampings and formed metal parts that are provided with lightening and cooling openings. The stamped metal parts form a housing, and guard enclosure for current carrying members arranged therein in an insulated manner, providing the coolest insulated holder ever made.

I accomplish these and other objects, in the manner set forth in the following specifications as illustrated in the accompanying drawing, in which FIG. 1 is a side sectional view of the invention.

FIG. 2 is a top sectional view taken along the line 2—2 in FIG. 1.

FIGS. 3, 4, 5, 6, and 7, are sectional views taken along the lines 3—3, 4—4, 5—5, 6—6, and 7—7 respectfully of FIG. 1.

FIG. 8 is a side sectional view of a modified form of the invention.

FIGS. 9, 10, 11, and 12 are sectional views taken along the lines 9—9, 10—10, 11—11, and 12—12 respectfully of FIG. 8.

Referring now to FIGS. 1 to 7, there is illustrated in the drawing, a tubular gripping handle 15 preferably made of insulating material and attached at one of its open ends to a pair of parallel arranged non-current carrying metallic housing plates 16 on one side and plate 17 on the other side, each having their ends secured within a portion of the tubular gripping handle 15 by machine screws or rivets 18. Housing plates 16 and 17 form a housing to contain and secure in an insulated manner, by the use of two transversely arranged bolts 19 that are insulated by the use of four small cylindrically shaped insulation bushings 20 that are arranged on the insides of housing plates 16 and 17. Insulation bushings 20 are adapted to fit partly into recessed portions 21 provided on the sides of a current conducting metallic body 22 that also has recess connecting holes 23 that are large enough for bolts 19 to pass through them without making any side contact with any current conducting metal, and is insulated by clearance allowed and retained by the screws being aligned in the centers of holes 23 by the insulation bushings 20, in being partly fitted in the recessed holes they space align and insulate transversely arranged bolts 19 and the metallic housing plates 16 and 17 very effectively. A minimum of insulation is used to allow maximum atmospheric air circulation about all parts of the housing and current conducting body.

Metallic housing plates 16 and 17 are preferably made of steel stampings and are provided with cooling and lightening holes 24 and are also provided with a formed portion 25 arranged to act as a strong metallic guard to protect the bottom portion of the central current conducting metallic body 22 that is contained within the area protected by the metallic housing.

Metallic housing plates 16 and 17 have a shaped upper forward portion adapted to engage a shaft pin 26 arranged to hingedly mount a welding rod clamping handle 27 that is preferably made of steel stampings and heat treated, being formed with a curve having its underside channel shaped, and is provided with punched out lightening and cooling openings 28. Welding rod clamping handle 27 is arranged to operate over and between housing plates 16 and 17 and arranged toward the rear portion there is a formed projection 29, that is adapted to retain a compression spring 30, adapted to exert an outward force between the underside of the welding rod clamping handle 27 and recess 31 being provided in a spring retaining insulation part 32 having a reduced diameter 33 to seat and engage in recess 34 arranged on the upper center portion of the metallic current conducting body 22. Force of compression spring 30 keeps spring insulation 32 well in recess 34 in turn provides an outward force on the rear side of shaft pin 26 and an operational inward clamping force at the forward side of shaft pin 26.

The foremost forward portion of the welding rod clamping handle 27 is provided with a dovetail shaped portion 35 at its underside and provided with a pressed out section 36 that serves as a stop for a dovetail shaped insulation block 37 that is fitted in and retained by the spring tension of dovetail portion 35. Dovetail insulation block 37 is provided with a spherical contact rivet 38 that is shown embedded in the insulation block 37 in a manner to contain all parts except the spherical portion in an insulated manner.

Spherical shaped contact rivet 38 is adapted to operate toward and away from V groove 39 or 40 arranged on a rotatable jaw body 41 that is rotatably mounted on the current conducting metallic body 22. A rotatable jaw mounting section 42 is provided with an opening 43 adapted to engage the rotatable jaw 41. The jaw is preferably made of copper alloy and has a reduced diameter portion 44 to engage in opening 43 and is retained in place with spring tension means provided by a cupped spring 45 that is retained in place by the peened over flange portion 46. The cupped spring tension means may be increased to the limits of the cupped spring by additional peening of the flange portion 46. The spring tension on the rotatable welding rod receiving jaw 41 is great enough to prevent welding current resistance heat to develop at its point of rotation, also to provide the means whereby jaw 41 will rotate with adequate tension that is desirable for its operation.

The previously mentioned current conducting body 22 is preferably made of a current conducting material such as copper alloy, or die cast aluminum and is provided with lightening and cooling openings 47 provided throughout its length. The center portion of the current conducting metallic body is mounted and retained within the previously mentioned metallic housing plates 16 and 17 and may be arranged with flexible insulation strips 56 and 57 on their inner sides. The strips are not always required, but may be used only in extreme or unusual welding conditions as an added safety factor to prevent shorts that could be caused from excessive welding splatter of conducting material during welding. With or without insulation strips 56 and 57 the metallic housing plates 16 and 17 are insulated by the use of four small cylindrical shaped insulation bushings 20 arranged on their insides that are fitted partly into the recessed portion 21 provided in the metallic current conducting body 22, to insulate the body to prevent welding current from reaching the metallic housing.

The rear portion of the metallic body extends past the ends of the metallic plates 16 and 17 that are mounted within a hollow gripping handle 15, in a manner to be suspended centrally, without making any contact within the metallic side plates or the insides of the tubular gripping handle 15, at which point there is an enlarged round portion 48 arranged on the end portion of current conducting body 22. The enlarged portion is provided with a welding cable receiving bore 49. A set screw 50 is adapted to clamp welding cable 51 placed within bore 49 in a manner to clamp same without the removal of the tubular gripping handle or any parts of the welding rod holder, by the means of a set screw access opening 52 arranged to coincide with welding cable clamping set screw 50.

The forward portion of the current conducting metallic jaw comprises the mounting means for the previously mentioned rotatable jaw, that provides the user with any angle from 0° to 140° either side of the welding rod holder. Arranged below the jaw mounting section is provided an insulation block having a clearance recess 54 and is shaped to fit the front underside of the metallic current conducting body 22 by means of machine screw 55 engaged in metallic body 22 in a manner to insulate the current conducting metallic body 22.

In the modified form illustrated in FIGS. 8, 9, 10, 11, and 12, the construction is somewhat different so that new reference numbers will be employed to designate the parts. In the modification there is shown a tubular gripping handle 60 preferably made of insulating material and attached at one of its open ends to a pair of parallel arranged non-current carrying metallic housing plates 61 on one side and 62 on the other, each having their ends secured within a portion of the tubular gripping handle 60 by machine screws 63 not visible in the modified drawing, it is similar to machine screws 18 as shown in FIG. 2.

Housing plates 61 and 62 form a housing to contain and secure in an insulated manner a current conducting metallic body, by the use of two transversely arranged bolts 64 that are insulated by four small cylindrically shaped insulators 65 that are arranged on the insides of housing plates 61 and 62. Insulation bushings 65 are adapted to fit partly into recessed portions 66 provided in the sides of a current conducting metallic body 67 that also has recess connecting holes 68 that are large enough for bolts 64 to pass through them without making any side contact with any current conducting metal. Insulation is obtained by the clearance space allowed and retained by the screws being aligned in the centers of holes 68, by the insulation bushings 65 in being partly fitted in the recessed holes 66, they space, align and insulate transversely arranged bolts 64. The metallic housing plates 61 and 62 are insulated very effectively with a minimum use of insulation allowing atmospheric air circulation about all parts of the housing and current conducting body.

Metallic housing plates 61 and 62 are preferably made of steel stampings and are provided with cooling and lightening openings 69. A formed portion 70 is provided to serve as a metallic guard to protect the bottom portion of the central current conducting metallic body 67.

Metallic housing plates 61 and 62 have a shaped upper forward portion adapted to engage a shaft pin 71 arranged to hingedly mount a welding rod clamping handle 72 that is preferably made of steel stampings and heat treated, being formed with a curve having its underside channel shaped and is provided with punched out lightening and cooling openings 73.

The welding rod clamping handle 72 is arranged to operate over and between housing plates 61 and 62. Arranged toward the rear portion there is a formed projection 74 that is adapted to retain a compression spring 75 adapted to exert an outward force between the underside of the welding rod.

The welding rod clamping handle 72 has an enlarged channel section 80 at which portion there is provided from one to three reamed holes 81 provided to accommodate with varying degrees of leverage and positions to mount a shaft pin 82 that is provided with peened ends as a retaining means. A bolt means may also be used to mount an insulated bearing assembly comprising a pair of insulation bushings 83 mounted on the insides of an enlarged channel shaped portion 80 of the welding rod clamping handle 72 in a manner to bear a clamping side pressure against a metallic bushing 84 having a reduced diameter portion 85 telescope into recess 86 provided in a metallic bushing 87 and provided with a mounting hole 88 that is large enough to accommodate an insulation sleeve 89 engaged therein and arranged to mount on shaft pin 82 in an insulated manner, whereby shaft pin 82 clamps the assembly in a stationary manner.

A link connection 90 is provided with a reamed hole 91 adapted to hingedly mount on the bearing portion of insulated metallic bushing 87 on one end. The opposite end is provided with a reamed hole 92 whereby it is hingedly mounted to a shaft pin 93 that engages in one of the two reamed mounting holes 94 arranged on the extended clevis portion 95 of a second jaw current carrying member 96. Member 96 is centrally mounted on a shaft pin 97 engaged through the sidewalls 99 of a recessed portion 100 provided in a central current conducting body 67 that supplies current means and mounting means for the second jaw carrying member 96. It is actuated through the linkage by welding rod clamping handle 72 to operate an adjustable threadedly secured jaw 101 provided with locking nut 102 or a set screw. The jaw being adjustable for controlling leverage or tension. There is a second means whereby the reamed holes 81 on the welding rod clamping handle 72 and reamed clevis holes 94 located on second jaw carrying member 96 is also capable of controlling leverage, tension and angle, or any combination desired may be obtained.

The second jaw carrying current conducting member 96 has its adjustable jaw 101 adapted to operate toward, and away from V groove 103 and 104 arranged on a rotatable jaw body 105, by the action of the previously described welding rod clamping handle 72 that through manual control actuates the movement of adjustable jaw 101 and jaw carrying member 96 by the linkage assembly previously explained to operate in a manner to clamp welding rod placed between adjustable jaw 101 and rotatable V groove 103 or 104. The jaw body 105 is rotatably mounted in the current conducting metallic body 67 that has a rotatable jaw mounting section 106 provided with an opening 107 adapted to engage a reduced diameter portion 108 on rotatable jaw body 105.

The rotatable jaw portion 108 is provided with a threaded hole 109 adapted to engage a slotted thread portion 110 of a screw 120 adapted to secure a cupped spring washer 111 in an adjustable manner, having a tension control and locking means whereby, the tension will remain by the use of a small locking pin 112 being engaged through reamed hole 113 on portion 108 and through slotted portion 110, in a manner to lock screw 120 and to prevent turning between the parts mentioned. The pin is inserted, or removed through a somewhat larger hole 114 arranged transversely through the current conducting body as shown in FIG. 9. The controlled spring tension securing the rotatably mounted welding rod receiving jaw body 105 must be great enough to prevent resistance heat to develop at its point of rotation, and also, provide a means whereby the jaw will rotate with adequate tension that is desirable for its operation.

The previously mentioned current conducting body 67 is preferably made of a current conducting material such as copper alloy, or die cast aluminum and is provided with lightening and cooling openings 115 provided throughout its length. The center portion of the metallic current conducting body is mounted and retained within the previously mentioned metallic housing plates 61 and 62 in an insulated manner by being mounted between four insulation bushings 65 arranged on the sides in a manner to prevent welding current from reaching the metallic housing.

The rear portion of the metallic current conducting body 67 extends past the ends of the metallic housing plates 70 and 71 that are mounted within the tubular gripping handle 60 in a manner to be suspended centrally, without making any contact within the metallic housing plates, or the insides of the tubular gripping handle 60 at which point there is an enlarged portion 115 formed on the end of current conducting body 67 and is provided with a welding cable receiving bore 116 and provided with a communicating large set screw 117 adapted to clamp welding cable 118 placed within bore 116 in a manner to clamp the cable without the removal of the tubular gripping handle 67 or any other parts of the welding rod holder, by the use of an access opening 119 arranged to coincide with welding cable clamping set screw 117.

In the operation of the device, only the modified form is used in the character reference. However, the other shown form is similar except for the linkage arrangement. When it is desired to mount a welding rod into the jaw section of the welding rod holder, it is only necessary to hold the hand about the tubular gripping handle 60 and the welding rod clamping handle 72 in a manner to squeeze the two mentioned members together, this will move adjustable jaw 101 arranged on movable jaw holding body 96, having clevis 95 engaged on a link assembly insulated from, and secured to the underside of the welding rod gripping handle to move away from the welding rod receiving rotatable jaw body 105 provided with welding rod holding V groove 103 and 104 and placing a welding rod into either groove 103 or 104, upon releasing the squeezing force of the hand on the welding rod clamping handle in turn through the insulated linkage assembly connecting with the movable jaw member to bear a normal closing force against welding rod placed in V groove 103 or 104 and securely clamp same in place therebetween, in preparation to begin welding. The closing force pressure being supplied by compression spring 75 that is interposed between projection 74 retaining means and insulation 77 retaining means is arranged on the metallic current conducting body 67 of the welding rod holder.

When it is desired to hold a welding rod at a different angle, when the welding rod is placed between the jaws of the welding rod holder, it is only necessary to move the welding rod to any angle from 0° to a 140° angle to either side of the welding rod holder by the force of the welding rod when the welding arc is in operation, or by hand when the welding arc is not in operation. The rotatably mounted jaw is provided with a foolproof spring tension means to retain any set desired angle until reset by the welding operator. In the use of the holder, the need for bending and damaging welding rod is eliminated.

The welding rod holder is adapted to be made of steel stampings and die-casted parts for economy and strength, whereby lightness and cooling is obtained by blanked openings in the steel, or metallic parts, wherever it was possible to do so, to achieve maximum strength with minimum use of metal.

The advantages and features are as follows: The electrode holder provides the user with any welding angle changes desired while the welding arc is in operation and operated, having an ideal balance in tension control. The arrangement of parts, both inside and outside are provided with maximum atmospheric cooling means. The welding cable clamping means is merely suspended within the tubular gripping handle in a manner not to make any contact with the handle, thereby allowing air circulation about the welding cable and cable connection that prevents heat penetration to the tubular gripping handle, making possible the coolest operating tubular gripping handle arrangement ever to be used in welding rod holders.

While I have thus, illustrated and described my invention, it is not my desire to be limited to the precise form shown herein and I intend to cover such forms and modification as fall within the appended claims.

I claim:

1. In an electrode holder having a welding cable clamping head assembly secured to a tubular gripping handle, a portion of said assembly comprising a current conducting metallic body, an adjustable spring tensioned rotatably mounted rod receiving jaw mounted on one end of said body and a welding cable clamping means on the other end thereof, said metallic current conducting body being provided with a longitudinal recess about half the length of said body on its top portion, and forming two remaining sides, said remaining sides are provided with a transverse shaft pin adapted to hingedly mount a second coacting rod clamping jaw means, said second means having a clamping handle, said co-acting rod clamping means being provided with a jaw carrying member, said jaw carrying member being provided with a clevis opening on one end and provided with holes at various distances, a link between said handle and said jaw carrying members, said link adapted to pivotally mount on an insulated transversely mounted bushing in the underside of said clamping handle, said clamping handle adapted to operate movement of said second jaw means through the insulated link to eliminate the need of insulation about the welding rod receiving jaw portion.

2. An electrode holder according to claim 1, a clevis in said clevis opening having adjustable means thereon to pivotally mount said link on the other end thereof, said link being pivotally mounted on both ends, one end being pivotally mounted on said clevis and other end of said link being pivotally mounted to the underside of said welding rod clamping handle.

References Cited in the file of this patent

UNITED STATES PATENTS

| | | |
|---|---|---|
| 1,313,572 | Baker et al. | Aug. 19, 1919 |
| 1,748,346 | Hollup | Feb. 25, 1930 |
| 2,067,995 | Varner et al. | Jan. 19, 1937 |
| 2,174,809 | Varner | Oct. 3, 1939 |
| 2,393,742 | Brzitis | Jan. 29, 1946 |
| 2,427,002 | Jepson | Sept. 9, 1947 |
| 2,519,877 | Bevard | Aug. 22, 1950 |
| 2,708,229 | Pickering | May 10, 1955 |
| 2,722,588 | Wagner | Nov. 1, 1955 |
| 2,778,927 | Warren | Jan. 22, 1957 |
| 2,799,771 | Donnelly | July 16, 1957 |
| 2,823,298 | Carrier | Feb. 11, 1958 |